(12) United States Patent
Ethington et al.

(10) Patent No.: US 10,239,640 B2
(45) Date of Patent: Mar. 26, 2019

(54) PREDICTIVE AIRCRAFT MAINTENANCE SYSTEMS AND METHODS INCORPORATING CLASSIFIER ENSEMBLES

(71) Applicant: The Boeing Company, Chicago, IL (US)

(72) Inventors: James M. Ethington, Saint Charles, MO (US); Liessman E. Sturlaugson, Creve Coeur, MO (US); James Schimert, Seabeck, WA (US); Timothy J. Wilmering, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/966,372

(22) Filed: Dec. 11, 2015

(65) Prior Publication Data
US 2017/0166328 A1 Jun. 15, 2017

(51) Int. Cl.
*B64F 5/60* (2017.01)
*G07C 5/08* (2006.01)
(Continued)

(52) U.S. Cl.
CPC .......... *B64F 5/60* (2017.01); *G06Q 10/06311* (2013.01); *G06Q 10/20* (2013.01); *G07C 5/0841* (2013.01)

(58) Field of Classification Search
None
See application file for complete search history.

(56) References Cited

U.S. PATENT DOCUMENTS

| 7,693,900 B2 | 4/2010 | Wilmering et al. |
| 7,953,506 B2 | 5/2011 | Tookey et al. |

(Continued)

FOREIGN PATENT DOCUMENTS

WO   WO 01/95174   12/2001

OTHER PUBLICATIONS

U.S. Appl. No. 14/730,655, filed Jun. 4, 2015, Sturlaugson et al.
(Continued)

*Primary Examiner* — Lail A Kleinman
(74) *Attorney, Agent, or Firm* — Dascenzo Intellectual Property Law, P.C.

(57) ABSTRACT

Predictive aircraft maintenance systems and methods are disclosed. Predictive maintenance methods may include extracting feature data from flight data collected during a flight of the aircraft, applying an ensemble of related classifiers to produce a classifier indicator for each classifier of the ensemble of classifiers, aggregating the classifier indicators to produce an aggregate indicator indicating an aggregate category of a selected component for a threshold number of future flights, and determining the performance status of the selected component based on the aggregate indicator. The classifiers are each configured to indicate a category of the selected component within a given number of flights. The given number of flights for each classifier is different. The threshold number of future flights is greater than or equal to the maximum of the given numbers of the classifiers. Predictive maintenance systems may include modules configured to extract feature data, classify feature data, and aggregate classifications.

20 Claims, 4 Drawing Sheets

(51) Int. Cl.
 G06Q 10/06 (2012.01)
 G06Q 10/00 (2012.01)

(56) References Cited

U.S. PATENT DOCUMENTS

| | | | |
|---|---|---|---|
| 8,165,968 | B2 | 4/2012 | Ramesh et al. |
| 8,180,750 | B2 | 5/2012 | Wilmering et al. |
| 8,370,280 | B1 | 2/2013 | Lin et al. |
| 8,494,824 | B2 | 7/2013 | Schmitz et al. |
| 9,617,010 | B2 * | 4/2017 | Conrad ................. B64D 45/00 |
| 2008/0021604 | A1 | 1/2008 | Bouvier et al. |
| 2008/0154458 | A1 | 6/2008 | Brandstetter et al. |
| 2010/0241596 | A1 | 9/2010 | Lee et al. |
| 2012/0221193 | A1 | 8/2012 | Delaye et al. |
| 2013/0275059 | A1 | 10/2013 | Bernhard et al. |
| 2016/0259873 | A1 * | 9/2016 | Kessie ................. G06F 17/5018 |
| 2016/0300156 | A1 | 10/2016 | Bowers et al. |
| 2017/0369190 | A1 | 12/2017 | Ethington et al. |
| 2017/0372000 | A1 | 12/2017 | Ethington et al. |
| 2018/0136995 | A1 | 5/2018 | Sheppard et al. |

OTHER PUBLICATIONS

"Model Training and Tuning," downloaded from topepo.github.io/caret/training on May 4, 2015.

"The caret Package," downloaded from topepo.github.io/caret/index on May 4, 2015.

"Compare Multi-Class Classifiers: Letter Recognition," Microsoft Azure Machine Learning Gallery, downloaded from gallery.azureml.net/Experiment/a635502fc98b402a890efe21cec65b92 on May 4, 2015.

"Walkthrough Step 4: Train and Evaluate the Predictive Analytic Models," Microsoft, downloaded from azure.microsoft.com/en-us/documentation/articles/machine-learning-walkthrough-4-train-and-evaluate-models on May 4, 2015.

R. Caruana et al., "Ensemble Selection from Libraries of Models," Proceedings of the 21$^{st}$ International Conference on Machine Learning, Banff, Canada, Jul. 4-8, 2004.

C. Merkwirth et al., "A Short Introduction to ENTOOL," Jan. 14, 2003, pp. 1-11. Downloaded from j-wichard.de/entool/ on Mar. 14, 2017.

Kählert, "Specification and Evaluation of Prediction Concepts in Aircraft Maintenance," Dissertation D17, Technische Universitat Darmstadt, Apr. 4, 2017.

Wei, "Prediction of the Aircraft Fault Maintenance Sorties Based on Least Squares of Linear Regression," 2012 3rd International Conference on System Science, Engineering Design and Manufacturing Informatization, pp. 223-225, Oct. 20, 2012.

Hall et al., The WEKA Data Mining Software: An Update, SIGKDD Explorations, vol. 11, Issue 1, pp. 10-18, 2009.

Ghobbar, A. et al., Evaluation of forecasting methods for intermittent parts demand in the field of aviation: a predictive model, ScienceDirect Elsevier Computers & Operations Research, vol. 30, Issue 14, Dec. 2003, pp. 2097-2114, Dec. 2003.

Byington, C. et al., Data-driven neural network methodology to remaining life predictions for aircraft actuator components, 2004 IEEE Aerospace Conference Proceedings (IEEE Cat. No. 04TH8720), pp. 3581-3589, 2004.

Yan, W., Application of Random Forest to Aircraft Engine Fault Diagnosis, IMACS Multiconference on "Computational Engineering in Systems Applications" (CESA), vol. 1, pp. 468-475, Oct. 4-6, 2006.

Lienhardt, B. et al., Design Forum Failure—Finding Frequency for a Repairable System Subject to Hidden Failures, Journal of Aircraft, vol. 45, No. 5, pp. 1804-1809, Sep.-Oct. 2013

Soares, S. et al., Comparasion of a genetic algorithm and simulated annealing for automatic neural network ensemble development, Neurocomputing, vol. 121, pp. 498-511, Jun. 11, 2013.

Shevach, G. et al., Towards Performance Prognostics of a Launch Valve, Annual Conference of the Porgnostics and Health Management Society 2014, pp. 62-69, 2014.

* cited by examiner

PREDICTIVE AIRCRAFT MAINTENANCE SYSTEMS AND METHODS INCORPORATING CLASSIFIER ENSEMBLES

FIELD

The present disclosure relates to predictive aircraft maintenance systems and methods for indicating the status of selected components.

BACKGROUND

Aircraft and other complex apparatuses include a myriad of interoperating components. Many subsystems of components are designed for maintenance and/or repair. When such a subsystem or component performs unexpectedly (e.g., it becomes non-responsive or functions with degraded performance), the operation of the aircraft may be impacted and the aircraft may be subject to unscheduled maintenance and down time. As an example, valves in the environmental control systems of aircraft may become non-operational and may consequently result in strain on the environmental control system, fuel waste, aircraft down time, excess troubleshooting, strain on the replacement part supply, and/ or potential stress on other aircraft components and systems. The consequences of an unexpected need to repair or repair of the non-performing component may be much greater than the cost, in time and resources, to repair or replace the non-performing component.

For many components, operators currently have no insight into the health of the components. Moreover, subsystems and components may behave erratically and unexpectedly well before complete non-performance. The behavior of components that may lead to non-performance may manifest as merely non-specific system degradation and related effects.

Aircraft may be available for maintenance and diagnosis only between flights. If a component performs unexpectedly during a flight, the non-performing component may require an abrupt end to the flight, necessitating a return trip for repair or at least temporary abandonment of the aircraft.

After a component has performed unexpectedly during a flight and resulted in noticeable system performance degradation, maintenance staff may troubleshoot the aircraft function and eventually identify the non-performing part as a contributor to the observed system performance degradation. The unscheduled down time and maintenance to identify the issue and to repair or replace the non-performing component may lead to resource conflicts with the aircraft. The aircraft typically is unavailable for use during troubleshooting and repair. Additionally, the unscheduled down time and maintenance may lead to strains on the scheduling of maintenance personnel due to excess time troubleshooting and identifying the issue, and may lead to strains on the supply chain for replacement parts because the need for parts may not be predictable. This reactive response to non-performing components may be inefficient when compared to scheduled maintenance or a proactive response to impending component non-performance.

SUMMARY

Predictive aircraft maintenance systems and methods are disclosed. Predictive maintenance methods include methods of determining a performance status of a selected component in an aircraft by extracting feature data from flight data collected during a flight of the aircraft, applying an ensemble of related classifiers configured to identify categories to which the feature data belong to produce a classifier indicator for each classifier of the ensemble of related classifiers, aggregating the classifier indicators to produce an aggregate indicator that indicates an aggregate category of the selected component for a threshold number of future flights, and determining the performance status of the selected component relative to the threshold number of future flights based on the aggregate indicator. The classifiers are each configured to indicate a category of the selected component within a given number of flights. The given number of flights for each classifier is different. The threshold number of future flights is greater than or equal to the maximum of the given numbers of the classifiers.

Predictive maintenance systems include systems for determining a performance category of a selected component in an aircraft. Systems may include a feature extraction module, a classification module, and an aggregation module. The feature extraction module is configured to extract feature data from flight data collected during a flight of the aircraft. The classification module is configured to produce a classifier indicator for each classifier of an ensemble of related classifiers, each classifier being configured to indicate a category of the selected component within a given number of future flights based upon the feature data. The given numbers of the classifiers are different from each other. The aggregation module is configured to produce an aggregate indicator that indicates a performance category of the selected component for a threshold number of future flights. The threshold number of future flights is greater than or equal to the maximum of the given numbers of the classifiers.

DESCRIPTION

Figure 1:
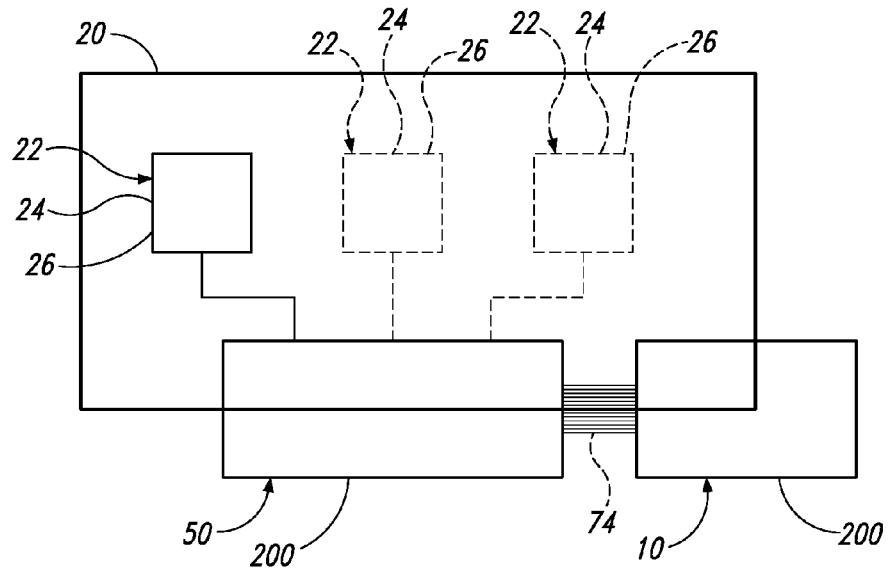
FIG. 1 is a schematic representation of an aircraft and associated predictive maintenance system.

Conventional approaches to detecting a non-performing component typically include a test to determine whether the subject component is functional (e.g., a built-in test system as typically found in aircraft). If the test indicates the component is performing unexpectedly, the operator and/or service personnel are notified of the need for repair or replacement. Generally, this type of testing provides only present, and possibly past, indications of component performance and no indication of future performance, such as impending non-performance. However, the operational characteristics of the component may indicate future behavior and/or the potential for future non-performance. Hence, the operational characteristics of the component may be utilized to reliably schedule component maintenance prior to any unexpected performance. As used herein, non-performing and non-performance include unexpected performance, degraded performance, and/or non-responsiveness. Non-performing and non-performance may include partial operation (e.g., when a component performs expectedly in some situations but not others, or when a component provides a functional but inadequate response) and complete non-operation (e.g., when a component does not respond to commands or other input, or when a component provides an unacceptable response).

By accurately predicting future component performance (i.e., when to expect non-performance events), repair and/or replacement of the component may be scheduled with other maintenance and/or inspections (reducing potential downtime), flights (for example) may be flown normally (without compromised subsystems and without compromised performance), and demand for replacement parts may be predicted with some reliability. The accurate prediction of component performance also may avoid unexpected performance of the subject component and sympathetic performance responses from related components or subsystems (e.g., due to the added stress of a non-performing component in a complicated subsystem).

FIGS. 1-5 illustrate predictive maintenance systems and methods according to the present disclosure. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

Figure 5:
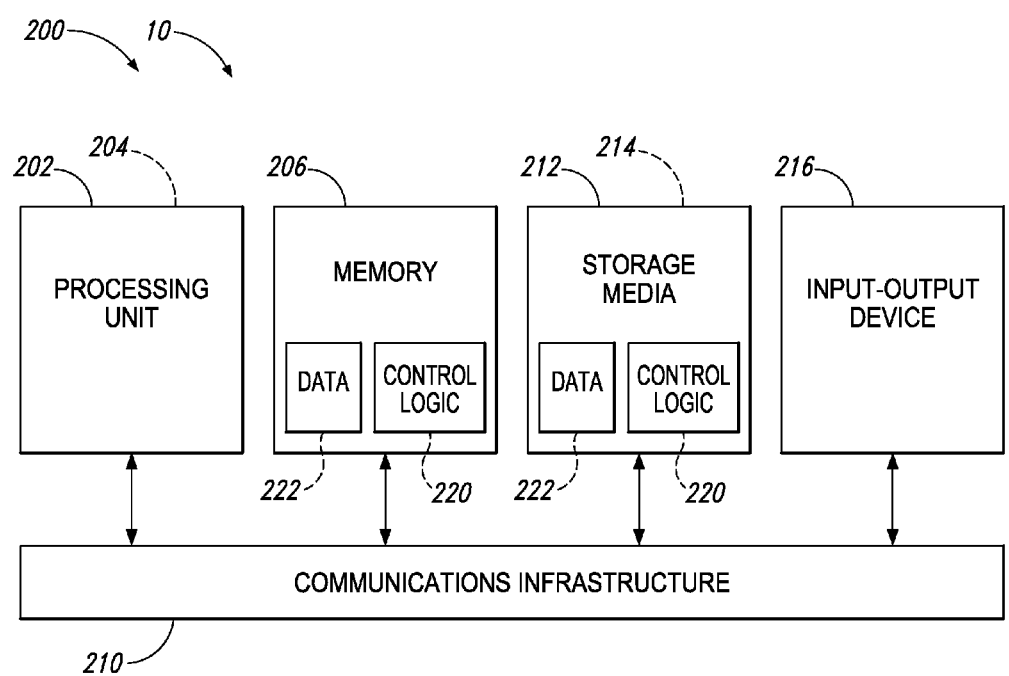
FIG. 5 is a schematic representation of a computerized system.

As illustrated in FIG. 1, a predictive maintenance system 10 includes a computerized system 200 (as further discussed with respect to FIG. 5). The predictive maintenance system 10 may be programmed to perform, and/or may store instructions to perform, the methods described herein.

The predictive maintenance system 10 is associated with an aircraft 20. The predictive maintenance system 10 may be an independent system and/or may be a part of the aircraft 20 (an on-board system, also referred to as an on-platform system), as schematically represented by the overlapping boxes of aircraft 20 and predictive maintenance system 10 in FIG. 1. In particular, where the predictive maintenance system 10 is physically independent of the aircraft 20, the predictive maintenance system 10 may be associated with a plurality of aircraft 20 (e.g., a fleet of aircraft 20).

Aircraft 20 are vehicles configured for flight and include one or more subsystems 22 that control, perform, and/or monitor one or more aspects of aircraft operation. Examples of subsystems 22, which also may be referred to as systems, include an environmental control system, a propulsion system, a flight control system, an electrical system, and a hydraulic system. Subsystems 22 may be a portion of other systems or subsystems of aircraft 20. For example, subsystem 22 may be a bleed air system which is a subsystem of an environmental control system. Subsystems 22 include one or more components 24 used to perform the function of the subsystem 22. Examples of components 24 include an engine, conduit, cabling, an electronics module, a valve, a switch, a regulator, an indicator, a pump, an actuator, and a battery. Components 24 may be referred to as parts, elements, modules, units, etc., and may be line replaceable and/or field replaceable (e.g., line replaceable units). Components 24 may be subsystems of the respective subsystem 22. Components 24 may be active and/or controlled components, i.e., components 24 are configured to change state during flight of the aircraft 20. Components 24 may be electrical, optical, mechanical, hydraulic, fluidic, pneumatic, and/or aerodynamic components. For example, components 24 may be electro-mechanical components such as a motor, an actuator, or a valve.

If a component 24 performs unexpectedly, or otherwise is non-performing, the operation of the corresponding subsystem 22 may be impacted. Many aircraft 20 are designed to be tolerant of component non-performance. For example, aircraft 20 may include redundant subsystems 22 and/or subsystems 22 may incorporate redundant components 24. Additionally or alternatively, subsystems 22 may be designed to safely operate with less than all components 24 fully functional, e.g., by operating with reduced performance.

Subsystems 22 generally include sensors 26 configured to measure and/or monitor the performance of individual components 24, groups of components 24, and/or the subsystem 22. Additionally or alternatively, sensors 26 may measure and/or monitor the environmental condition, the condition of one or more components 24, and/or the inputs and/or outputs of the subsystem 22. Sensors 26 may be utilized in built-in testing, performance monitoring, and/or subsystem control.

Further, aircraft 20 may include a controller 50 that may be configured to control and/or monitor one or more subsystems 22. Controller 50 may be on board the aircraft 20 (also referred to as on-platform), may be operated independent of the aircraft 20, and may be a system independent of the aircraft 20 (also referred to as off-platform), as schematically represented by the overlapping boxes of aircraft 20 and controller 50 in FIG. 1. Controller 50 and predictive maintenance system 10 may communicate via a data link 74. The data link 74 is an electronic communication link and may include one or more wired, wireless, radio, optical, and/or electrical communication channels.

Generally, sensors 26 and/or controllers 50 are configured to collect data during flight of the aircraft 20. The data collected are referred to as flight data. Data may include records of environmental conditions (e.g., temperature, pressure, humidity), aircraft operation (e.g., airspeed, altitude, ground location, angle of attack), subsystem operation (actual operation), subsystem command status (expected operation), component operation (actual operation), and/or component command status (expected operation). Controller 50 may be configured to store flight data and may be referred to as a flight data storage system.

The predictive maintenance system 10 may include an input-output device 216 (as further discussed with respect to FIG. 5) that is configured to present visual, audio, and/or tactile signals to an operator and/or user of the predictive maintenance system 10. The signals may be configured to indicate system information, for example, indicating the identity of the selected component 24, a performance status and/or performance category (e.g., operational, good, degraded performance, non-performing, impending non-performance, and/or maintenance needed), that the selected component 24 is likely to non-perform (or likely to perform), and/or the predicted remaining useful life of the selected component (e.g., the number of flights before predicted non-performance).

Figure 2:
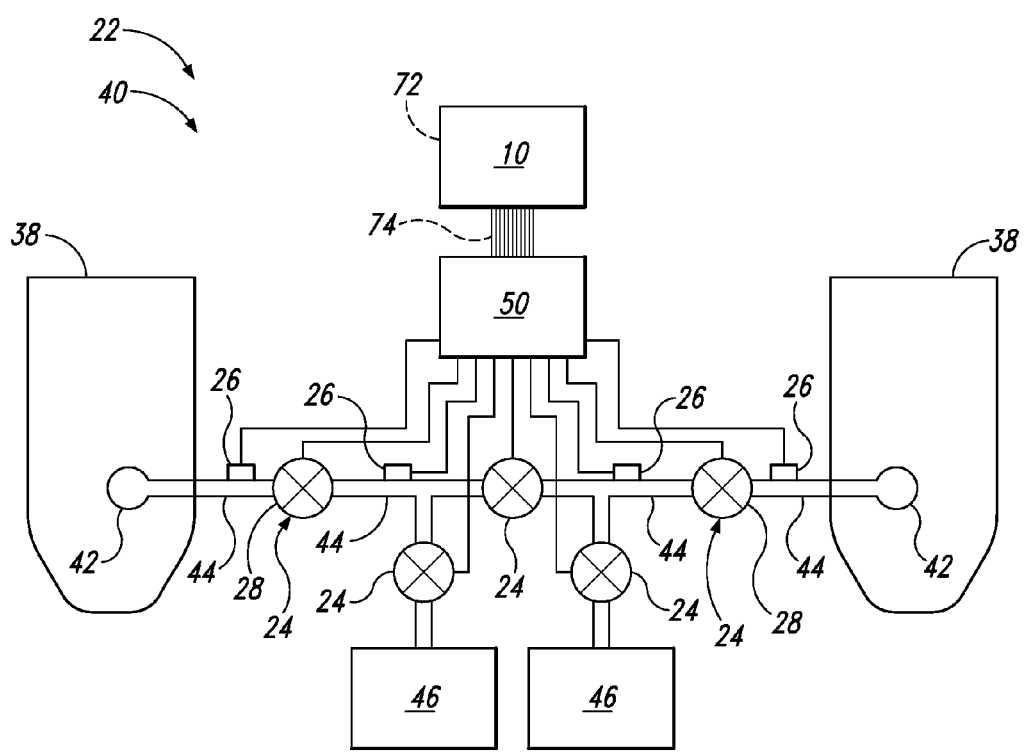
FIG. 2 is a schematic representation of an environmental control system of an aircraft.

To illustrate the discussion of subsystems 22 and components 24 in a particular example, FIG. 2 schematically represents an environmental control system 40, which is one of several subsystems 22 on a typical aircraft 20. The environmental control system 40 includes electronic, fluidic, pneumatic, and mechanical components 24.

Generally, the environmental control system 40 is configured to circulate air and to regulate the temperature and/or pressure of pressurized compartments of the aircraft, for example regulating the temperature and/or pressure of the cockpit and/or cabin. Additionally, the environmental control system 40 may be configured for avionics cooling, smoke detection, fire suppression, and cooling/heating and/or pressurization of other subsystems 22.

In jet aircraft, high pressure air is tapped (or bled) from one or more compressor stages of a jet engine 38. The air is tapped at a compressor air tap 42 to form a bleed air stream. The temperature and pressure of the bleed air depends on the engine operation (e.g., the revolutions per minute) and the compressor stage. The bleed air is ducted through a bleed air conduit 44 to one or more air conditioning systems 46 which adjust the pressure and/or temperature of the compressed air before transmitting the air to the pressurized compartments. The environmental control system 40 may receive compressed air from all engines 38 of a multi-engine aircraft, for example from the right engine 38 and the left engine 38. Pressure regulation, balancing, etc., may be controlled by one or more components 24 as the bleed air is transmitted to the one or more air conditioning systems 46. Examples of components 24 of environmental control systems 40 include valves, regulators, shutoff valves, non-return valves, over-pressure switches, relief valves, heat exchangers, water filters, air filters, and the air conditioning systems 46.

In aircraft with multiple engines 38, the environmental control system 40 may include separate air conditioning systems 46 configured primarily to operate with the bleed air from different engines. Environmental control systems 40 may be configured to equalize, mix, or otherwise combine the air from each engine 38 before transmitting the air to the air conditioning system(s) 46.

The environmental control system 40 may include one or more sensors 26 (e.g., pressure transducers, temperature sensors, and/or flow meters) configured to measure and/or monitor gas (e.g., air) and/or liquid within the environmental control system 40. For example, sensors 26 may be located upstream and/or downstream of a component 24 (e.g., a valve, a regulator, etc.) and may be located downstream of the compressor air taps 42. The sensors 26 and the components 24 may be controlled by a controller 50 that is in electrical and/or electronic communication with the sensors 26 and/or components 24.

Within the environmental control system 40 represented in FIG. 2 are two primary bleed air pressure regulating and shutoff valves 28, each configured to restrict the bleed air flow as necessary to maintain the desired pressure and air flow to downstream systems. Valves 28 also may be referred to as manifold pressure regulating shutoff valves. Valves 28 are configured to control the bleed air flow within the associated bleed air conduit 44 and ultimately to control the input air flow to the associated air conditioning system(s) 46. Each bleed air conduit 44 coming from each engine 38 is instrumented with at least one sensor 26. The sensors 26 are configured to measure a property of the air flow upstream, downstream, and/or across the primary bleed air pressure regulating and shutoff valves 28.

If one of the primary bleed air pressure regulating and shutoff valves 28 performs unexpectedly (e.g., by opening inconsistently or incompletely when commanded) bleed air from the other engine 38 may be routed to both air conditioning systems 46 and, hence, the overall environmental control system 40 may continue to operate. For example, air may be rerouted around the non-performing valve and/or the environmental control system 40 may operate at reduced performance (e.g., utilizing air from just one engine). Because the environmental control system 40 may be resilient enough to continue to operate without one of the primary bleed air pressure regulating and shutoff valves 28, even complete non-performance or severe degradation may not be immediately noticed and repaired. Once a non-performing valve has been identified, the non-performing valve may be repaired as soon as possible, e.g., before the next flight.

Where it is hard to predict when a component 24 may perform unexpectedly, the urgency to repair a non-performing component may be heightened (e.g., to avoid having a subsystem 22 with more than one non-performing component). Further, unexpected performance of some components 24 may stress the respective subsystem 22 and may contribute to and/or cause other components to perform unexpectedly. For example, a partially or completely non-performing valve 28 in the environmental control system 40 may lead to a frozen condenser and/or a damaged air cycle machine (both components 24 of the environmental control system 40 and the air conditioning system 46). Hence, the valve 28 typically is immediately repaired when non-performance is identified. The urgent repair may result in aborted flights and/or unscheduled maintenance of the aircraft, with the consequent unscheduled downtime, and may strain the supply chain for replacement parts. Unscheduled repair and downtime may lead to a lower availability of the aircraft and/or the lack of availability of the aircraft at critical moments in time.

Though examples may refer to environmental control systems 40 and/or to aircraft 20, the systems and methods of this disclosure may be utilized with other subsystems 22 and other apparatuses. For example, the subsystem 22 may be a propulsion system and the controlled component may be an electronic switch. Further, systems and methods of the present disclosure may be applied to other vehicles and/or machinery. Hence, a reference to aircraft 20 may be replaced with a reference to a vehicle and/or machinery. Corresponding terms like flight may be replaced by terms like excursion and/or operation; flying may be replaced by driving, operating, and/or running.

As used herein, the term 'fleet' refers to one or more of the subject aircraft, vehicles, and/or machinery. A fleet may refer to all of the subject aircraft, vehicles and/or machinery at a location, based at a location, used for a similar purpose, and/or used by a corporate entity (e.g., a corporation, a military unit). For a fleet of aircraft, each aircraft 20 may be substantially identical with the same types of subsystems 22 and the same types of components 24 in the subsystems 22. As used herein, components 24 of the same type are components 24 in equivalent locations, serving equivalent functions in the different aircraft 20 and/or subsystems 22.

Figure 3:
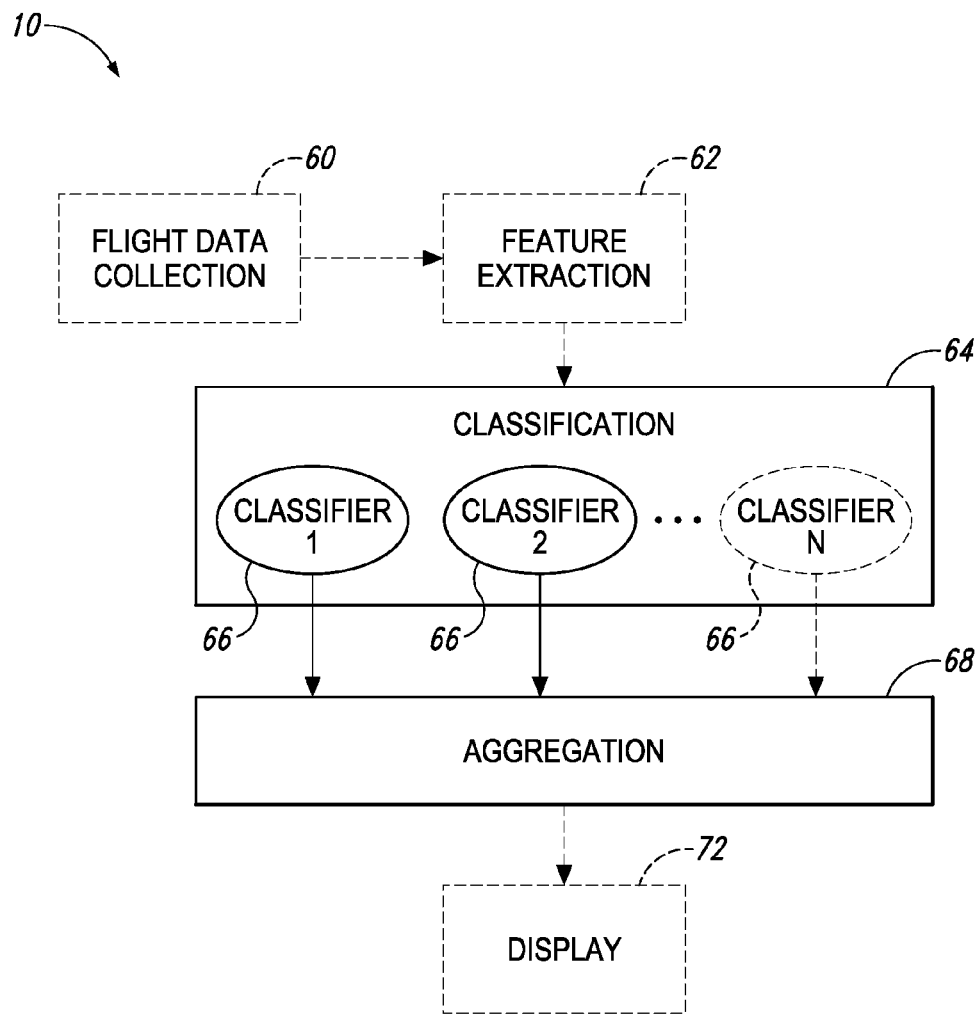
FIG. 3 is a schematic representation of a predictive maintenance system.

FIG. 3 is a schematic representation of a predictive maintenance system 10. The predictive maintenance system 10 is configured to utilize flight data and/or feature data extracted from flight data to identify categories to which the feature data belong (e.g., to estimate the likelihood of non-performance and/or performance of a component during a future flight of the aircraft). Categories also may be referred to as predictions and/or estimates of performance of the component during future flights (e.g., estimates of the likelihood of non-performance also may be referred to as predictions of future non-performance). The flight data and/or extracted feature data may relate to the component directly or may relate to the associated subsystem and/or aircraft.

The predictive maintenance system 10 may be part of a health management system and/or a health assessment system for the associated aircraft (on-platform or off-platform). Additionally or alternatively, the predictive maintenance system 10 may be utilized to create predictive models for a health management system and/or a health assessment system. The health management system and/or the health assessment system may be configured to monitor, assess, and/or indicate the operational status of one or more components of the aircraft.

The predictive maintenance system 10 utilizes data analytics in the form of machine learning classifiers 66 to identify conditions which may indicate future performance (e.g., impending non-performance event) of a component. The predictive maintenance system 10 may discover and communicate meaningful patterns in the flight data and/or extracted feature data that indicate impending non-performance of a selected component. For example, the predictive maintenance system 10 may be applied to the primary bleed air pressure regulating and shutoff valve of an environmental control system. When applied, the predictive maintenance system 10 may predict and/or trend a non-performance event of the selected component (e.g., valve) before it occurs and also may provide a remaining useful life (RUL) estimate of the number of flights before actual non-performance is expected to occur.

As schematically represented in FIG. 3, the predictive maintenance system 10 includes several modules (e.g., instructions and/or data configured to be executed by a computerized system as described with respect to FIG. 5). These modules may be referred to as agents, programs, processes, and/or procedures.

The predictive maintenance system 10 includes a classification module 64 and an aggregation module 68. The classification module 64 is configured to classify extracted feature data, i.e., to utilize features extracted from flight data to form an ensemble of estimates of the status of the selected component (e.g., the future performance, the likelihood of non-performance, whether non-performance is imminent or not, whether the component is performing as expected or not). The aggregation module 68 is configured to aggregate classifications of the classification module 64, i.e., to combine the ensemble of estimates to form a single aggregate estimate of the status of the selected component. Though the reliability of the individual estimates of the ensemble of estimates may be high, by aggregating related estimates produced by the classification module 64, the aggregation module 68 is configured to produce an aggregate estimate of the status of the selected component that is more reliable than the individual estimates.

The classification module 64 is configured to apply an ensemble of related classifiers 66 to the extracted features of the flight data. An ensemble of related classifiers also may be referred to as a group and/or a plurality of (related) classifiers. Classifiers 66, also referred to as models, are machine learning algorithms that identify (i.e., classify) the category (a sub-population) to which a new observation (set of extracted features) belongs. Classifiers 66 are chosen and/or configured to transform extracted features into an indication of the category (e.g., performance status) of the selected component for a given number of future flights. For example, the indication of the category may be an estimate of the likelihood of the selected component's performance and/or non-performance within a given number of future flights. Classifiers 66 are related in that each relate to the same selected component and to the same type of categories (e.g., same performance status, a likelihood of non-performance, a likelihood of expected performance, etc.), albeit for different time periods as disclosed herein. Thus, the outputs of the (related) classifiers 66 (also referred to as the classifier indicators) may include a probability metric (e.g., a number representing the likelihood of component non-performance), a "good" state (indicating a likelihood of component performance above a predetermined threshold and/or indicating a likelihood of component non-performance below a predetermined threshold), an "impending non-performance" state (indicating a likelihood of component non-performance above a predetermined threshold and/or indicating a likelihood of component performance below a predetermined threshold), and/or an "abstain" state (indicating the classifier did not reliably establish another state and/or metric). The "good" state also may be referred to as the "no impending non-performance" state, the "no impending non-performance event" state, the "no maintenance needed" state, and/or the "low risk" state. The "impending non-performance" state also may be referred to as the "impending non-performance event" state, the "maintenance needed," and/or the "high risk" state. Classifiers 66 may be configured to produce more than one output, for example, producing a weight for a "good" state and a weight for an "impending non-performance" state. Outputs from classifiers 66 may be individually normalized (e.g., a probability metric normalized to 1 for 100% probable) and/or normalized in aggregate (e.g., the sum of all outputs is 1).

Classifiers 66 may be the result of supervised machine learning and/or guided machine learning in which training data (extracted feature sets which correspond to known outcomes) are analyzed to discern the underlying functional relationship between the extracted features and the outcomes. The underlying function may be an analytical function, a statistical correlation (e.g., a regression), and/or a classification algorithm. Examples of statistical correlations include logistic regression and probit regression. Examples of classification algorithms include naïve Bayes classifiers, support vector machines, learned decision trees, ensembles of learned decision tress (e.g., random forests of learned decision trees), and neural networks. Generally, supervised machine learning includes determining the input feature set (the features extracted from the underlying example data), determining the structure of the learned function and corresponding learning algorithm (e.g., support vector machine and/or learned decision trees), applying the learning algorithm to the training data to train the learned function (i.e., the classifier), and evaluating the accuracy of the learned function (e.g., applying the learned function to a test data set with known outcomes to verify the performance of the learned function).

Each classifier 66 is configured to provide a category of the component relating to a given number of future flights (e.g., relating to a predicted performance within the given number of future flights and/or within a given time horizon related to the number of future flights). Classifiers 66 of the ensemble of related classifiers each provide a category (e.g., a likelihood of component non-performance) relating to a different given number of flights (hence, the ensemble also may be referred to as an ensemble of different time horizon classifiers). For example, the ensemble of related classifiers may include a first classifier 66 that provides a category (e.g., the likelihood of component non-performance) relating to the next flight and a second classifier 66 that provides a category (e.g., the likelihood of component non-performance) relating to the next two flights. The differing numbers of flights among the classifiers 66 may form a series and may form a consecutive sequence of integers beginning at 1. For example, the ensemble of related classifiers may estimate the future performance within 1 flight, 2 flights, 3 flights, 4 flights, and 5 flights. Though the example illustrates a sequence of 1 to 5, other maximum numbers in the sequence may be suitable, for example 2, 3, 4, or greater than 5.

The predictive maintenance system 10 includes an aggregation module 68 that is configured to produce an aggregate indicator based upon the classifier indicators (outputs) of the ensemble of related classifiers 66 of the classification module 64. The aggregate indicator indicates an aggregate category (e.g., the likelihood of component non-performance) relating to a threshold number of future flights. The aggregate category also may be called the performance category. The threshold number is related to the numbers of flights estimated by the ensemble of related classifiers and generally is greater than or equal to the maximum number of flights estimated by the ensemble of related classifiers. For example, the aggregate indicator may indicate the future performance within 5 flights based upon an ensemble of classifier indicators that indicate the likelihood of component non-performance within 1 flight, 2 flights, 3 flights, 4 flights, and 5 flights.

The aggregation module 68 may be configured to set (i.e., equate) the aggregate indicator to one of a maximum value of the classifier indicators, a minimum value of the classifier indicators, a median value of the classifier indicators, an average value of the classifier indicators, a mode of the classifier indicators, a most common value of the classifier indicators, and a cumulative value of the classifier indicators. Where one or more of the classifier indicators is a non-Boolean type (e.g., a real value such as a probability metric), the aggregation module 68 may be configured to classify such non-Boolean classifier indicators as one of two states (e.g., an impending-non-performance state or a likely-performance state). For example, a likelihood of component non-performance greater than 20% may be classified as an impending-non-performance state, while a likelihood of component non-performance of 20% or less may be classified as a likely-performance state. The threshold of 20% is illustrative only and may be different for different components, different subsystems, and/or different classifier indicators.

As an example aggregation approach, the aggregation module 68 may be configured to determine the maximum value of the ensemble of classifier indicators, optionally normalizing the values of the classifier indicators. This approach may be referred to as the maximum value approach. The aggregate indicator may be set to the maximum (normalized) value of the ensemble of classifier indicators and/or may be set to a state (e.g., an impending-non-performance state or a likely-performance state) indicated by the maximum value.

As another example aggregation approach, the aggregation module 68 may be configured to determine the most common classifier indicator state among the ensemble of classifier indicators. This approach may be referred to as the majority vote approach. If one or more of the classifier indicators is a non-Boolean type, the classifier indicators may be classified as a particular state, as described herein, prior to determining the most common classifier indicator state.

As yet another example aggregation approach, the aggregation module 68 may be configured to determine the cumulative value of the ensemble of classifier indicators. This approach may be referred to as the cumulative weight approach. The aggregate indicator may be set to the cumulative value, the average value, or may be set to the state (e.g., the impending-non-performance state or the likely-performance state) indicated by the cumulative value and/or the average value. If the classifiers each produce more than one classifier indicator, the cumulative value of the corresponding classifier indicators may be determined. For example, if each classifier produces a weight for a likely-performance state and a weight for an impending-non-performance state, the cumulative weight for the likely-performance state and the cumulative weight for the impending-non-performance state may be determined. The aggregate indicator may be set to the state corresponding to the maximum of the cumulative weights.

Predictive maintenance systems 10 may include a feature extraction module 62 that is configured to extract feature data from flight data collected during a flight of the aircraft. The flight data and the extracted feature data may relate to the performance of the aircraft, the subsystem that includes the selected component, and/or the selected component. The flight data may be collected during a single flight or a series of flights. Using flight data from a series of flights may provide a more reliable prediction of component performance because of the greater amount of flight data and/or because the aircraft, the subsystem, and/or the component are more likely to be subjected to a greater range of conditions and/or particular stress conditions.

Examples of flight data include an indication of weight on wheels, sensor status (e.g., operating normally, degraded performance, non-responsive), subsystem settings (e.g., environmental control system mode is automatic or manual, bleed air is commanded on or off), component settings (e.g., a valve is commanded open or closed), sensor values, airspeed, engine throttle, a temperature, a pressure, a voltage, a current, ambient temperature, ambient pressure, compressor discharge pressure, compressor discharge temperature, bleed air pressure, and/or bleed air temperature.

Flight data may be collected systematically, e.g., consistently on substantially every flight, consistently in substantially every aircraft, and/or on a consistent basis (e.g., periodically). Flight data relating to different sensors may be collected at different times or at substantially the same time. Flight data relating to the same sensor generally forms a time series (e.g., periodic, quasi-periodic, or aperiodic).

The feature extraction module 62 may be configured to extract feature data that may be correlated to and/or may indicate likely component performance. The feature extraction module 62 may be configured to determine a statistic of sensor values during a time window, a difference of sensor values during a time window, and/or a difference between sensor values measured at different locations and/or different points in time. Such differences and/or statistics may be referred to as feature data and/or extracted feature data. Feature data generally is derived from sensor values that relate to the same sensed parameter (e.g., a pressure, a temperature, a speed, a voltage, and a current). The statistic of sensor values may include, and/or may be, a minimum, a maximum, an average, a variance, a deviation, a cumulative value, a rate of change, and/or an average rate of change.

Additionally or alternatively, the statistic of sensor values may include, and/or may be, a total number of data points, a maximum number of sequential data points, a minimum number of sequential data points, an average number of sequential data points, an aggregate time, a maximum time, a minimum time, and/or an average time that the sensor values are above, below, or about equal to a threshold value. The time window may be the duration of a flight of the aircraft, a portion of the duration of a flight of the aircraft, or a period of time including one or more flights of the aircraft. For example, the time window may be at least 0.1 seconds, at least 1 second, at least 10 seconds, at least 100 seconds, at most 1,000 seconds, at most 1 hour, about 1 second, and/or about 500 seconds. As other examples, the time window may be minutes, hours, days, weeks, or months.

Additionally or alternatively, the feature extraction module 62 may be configured to analyze and/or extract sensor values within certain constraints. For example, sensor values may be subject to analysis only if within a predetermined range (e.g., outlier data may be excluded) and/or if other sensor values are within a predetermined range (e.g., one sensor value may qualify the acceptance of another sensor value). As more particular examples, the data collected from a bleed air pressure sensor may be analyzed if the bleed air pressure is above a minimum value, if the bleed air pressure is below a maximum value, if the aircraft was flying (e.g., weight was off the wheels during the collection), if the pressure sensor was operational, if the aircraft airspeed was above a minimum value, and/or if the engine(s) was (were) operating at a speed.

The classification module 64 may be configured to apply the ensemble of related classifiers 66 to the feature data extracted from the flight data from one or more previous flights. Each classifier 66 may be supplied the same feature data or a different subset of the feature data. For example, each classifier 66 of an ensemble of two classifiers that estimates the future component performance within 1 flight and 2 flights may be supplied feature data relating to three previous flights. As another example, a classifier 66 configured to estimate the future component performance within one flight may be supplied feature data relating to more flights than a classifier 66 configured to estimate the likelihood of component non-performance within more than one flight.

Predictive maintenance systems 10 may include a flight data collection module 60 that is configured to collect flight data during one or more flights. Flight data may be collected by the controller(s) 50 and/or the sensor(s) 26 as described herein with respect to FIG. 1. The flight data collection module 60 may be configured to collect flight data automatically, e.g., whenever the aircraft is flown.

Predictive maintenance systems 10 may include a display module 72 that is configured to communicate the results of the classification module 64, modules 66, and/or aggregation module 68 to the user. For example, the display module 72 may be configured to communicate the classifier indicators and/or the aggregate indicator. The display module 72 may be configured to communicate system information, such as the identity of the selected component.

Figure 4:
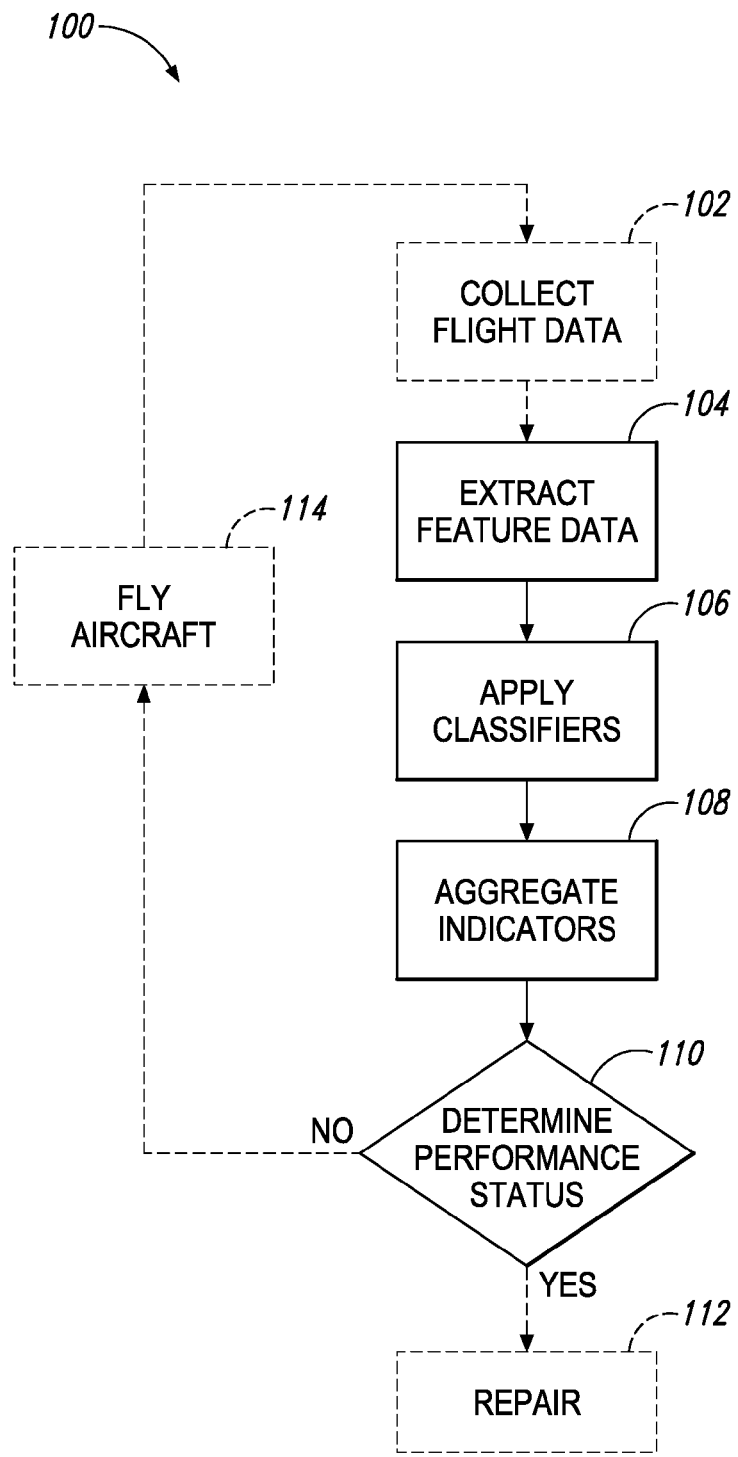
FIG. 4 is a schematic representation of predictive maintenance methods.

FIG. 4 schematically illustrates predictive maintenance methods 100. Methods 100 may be utilized to impact health management of aircraft systems. By reliably predicting future component performance (e.g., a future non-performance event) and thereby enabling a more predictive schedule for repairs and demand for spare parts, methods 100 may contribute to overall aircraft maintenance, fleet management, and material logistics. Methods 100 may include methods of preventative maintenance, methods of determining performance status, and/or methods of determining impending non-performance of components and/or systems.

Methods 100 include applying 106 an ensemble of related classifiers to feature data extracted from flight data to produce a classifier indicator for each classifier of the ensemble of related classifiers and aggregating 108 the classifier indicators to produce an aggregate indicator that indicates an aggregate category of a selected component of an aircraft for a threshold number of future flights (e.g., whether the selected component is likely to perform or not within the threshold number of future flights). Methods 100 may include operating and/or utilizing the predictive maintenance system 10. Applying 106 may include operating and/or utilizing the classification module 64. Aggregating 108 may include operating and/or utilizing the aggregation module 68.

Applying 106 may include applying classifiers that each are configured to indicate the category (e.g., the likelihood of non-performance) of the selected component within a given number of future flights of the aircraft. The given numbers of each of the classifiers may be different and the group of given numbers may be a series and/or a consecutive sequence of integers beginning with 1. Classifiers and ensembles of related classifiers may be as described with respect to the predictive maintenance system 10 and/or the classification module 64.

Aggregating 108 may include setting (i.e., equating) the aggregate indicator to one of a maximum value of the classifier indicators, a minimum value of the classifier indicators, a median value of the classifier indicators, an average value of the classifier indicators, a mode of the classifier indicators, a most common value of the classifier indicators, and a cumulative value of the classifier indicators. Where one or more of the classifier indicators is a non-Boolean type (e.g., a real value such as a probability metric), aggregating 108 may include classifying such non-Boolean classifier indicators as one of two states (e.g., an impending-non-performance state or a likely performance state). For example, a likelihood of component non-performance greater than 20% may be classified as an impending-non-performance state, while a likelihood of component non-performance of 20% or less may be classified as a likely-performance state. The threshold of 20% is illustrative only and may be different for different components, different subsystems, and/or different classifier indicators.

Aggregating 108 may include setting the aggregate indicator following the maximum value approach, the majority vote approach, and/or the cumulative weight approach. The threshold number of future flights may be related to the given numbers of the classifiers and may be the maximum of the given numbers of the classifiers, as described with respect to the aggregation module 68.

Methods 100 may include extracting 104 feature data from flight data collected during a flight of the aircraft. As described herein, flight data and/or feature data may relate to the performance of the aircraft, a subsystem of the aircraft that includes the selected component, and/or the selected component. Extracting 104 may include operating and/or utilizing the feature extraction module 62. Extracting 104 may include determining a statistic of sensor values during a time window, a difference of sensor values during a time window, and/or a difference between sensor values measured at different locations and/or different points in time as described with respect to the feature extraction module 62.

Methods 100 may include collecting 102 flight data during a flight of the aircraft. Collecting 102 may include collecting flight data for a series of flights. Collecting 102 may include operating and/or utilizing the flight data collection module 60, the controller(s) 50, the sensor(s) 26, and/or the aircraft 20 (e.g., if flight data collection module 60 is configured to collect flight data whenever the aircraft is flown). Methods 100 may include flying 114 the aircraft. Flying 114 the aircraft may cause collecting 102. Flying 114 may include routine flying or flying to stress and/or to test the aircraft, the subsystem including the selected component, and/or the selected component.

Methods 100 may include displaying the aggregate indicator (and/or a representation relating to the aggregate indicator) by visual, audio, and/or tactile display, for example, by utilizing and/or operating the input-output device 216 and/or the display module 72. Additionally or alternatively, methods 100 may include signaling by visual, audio, and/or tactile indicator that the selected component is likely to perform or to have a non-performance event within the threshold number of future flights. The displaying and/or signaling may include on-board (on platform) and/or off-board (off platform) display and/or signals.

Methods 100 may include determining 110 the performance status of the selected component based upon the aggregate indicator. Determining 110 may include determining whether the selected component is likely to perform or not within the threshold number of future flights. Determining 110 may include determining the state of the aggregate indicator and/or evaluating the value of the aggregate indicator relative to a predetermined limit (e.g., less than, greater than, and/or about equal to the limit). For example, the need for maintenance may be associated with aggregate indicators indicating an impending-non-performance state with a likelihood greater than a predetermined limit.

Methods 100 may further include repairing 112 the selected component. Repairing 112 may include repairing, replacing, refurbishing, mitigating, and/or servicing (e.g., lubricating, cleaning) the selected component. Methods 100 may include determining whether to repair and/or repairing 112 upon determining 110 the performance status (e.g., determining that a repair would be useful and/or warranted based upon the aggregate indicator). For example, determining whether to repair may include evaluating the value of the aggregate indicator relative to a predetermined limit (e.g., less than, greater than, and/or about equal to the limit). Where methods 100 include a form of repairing (e.g., repairing 112, repairing 112 upon determining that a repair would be useful, and/or determining whether to repair), methods 100 may be referred to as preventative maintenance methods.

FIG. 5 schematically represents a computerized system 200 that may be used to implement and/or instantiate predictive maintenance systems 10 and components thereof, such as controller 50, flight data collection module 60, feature extraction module 62, classification module 64, aggregation module 68, and/or display module 72. The computerized system 200 includes a processing unit 202 operatively coupled to a computer-readable memory 206 by a communications infrastructure 210. The processing unit 202 may include one or more computer processors 204 and may include a distributed group of computer processors 204. The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214.

The communications infrastructure 210 may include a local data bus, a communication interface, and/or a network interface. The communications infrastructure 210 may be configured to transmit and/or to receive signals, such as electrical, electromagnetic, optical, and/or acoustic signals. For example, the communications infrastructure 210 may be configured to manage data link 74.

The computerized system 200 may include one or more input-output devices 216 operatively coupled to the processing unit 202, the computer-readable memory 206, and/or the computer-readable storage media assemblage 212. Input-output devices 216 may be configured for visual, audio, and/or tactile input and/or output. Each input-output device 216 independently may be configured for only input, only output, primarily input, primarily output, and/or a combination of input and output. Examples of input-output devices 216 include monitors (e.g., video monitor), displays (e.g., alphanumeric displays, lamps, and/or LEDs), keyboards, pointing devices (e.g., mice), touch screens, speakers, buzzers, and weights.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, and/or hardware) may include instructions that, when executed by the processing unit 202, cause the computerized system 200 to perform one or more of the methods described herein. Control logic 220 may include one or more of the flight data collection module 60, feature extraction module 62, classification module 64, classifier 66, aggregation module 68, and/or display module 72. Data 222 may include flight data and/or data associated with the modules and/or methods described herein.

Examples of inventive subject matter according to the present disclosure are described in the following enumerated paragraphs.

A1. A method of determining a performance status of a selected component in an aircraft, the method comprising:

extracting feature data from flight data collected during a flight of the aircraft, wherein the feature data relates to performance of one or more components of the aircraft and/or a subsystem of the aircraft;

applying an ensemble of related classifiers configured to identify categories to which the feature data belong to produce a classifier indicator for each classifier of the ensemble of related classifiers, wherein each classifier is configured to indicate a category of the selected component of the aircraft within a given number of future flights, and wherein the given number for each classifier is different;

aggregating the classifier indicators to produce an aggregate indicator that indicates an aggregate category of the selected component for a threshold number of future flights, wherein the threshold number is greater than or equal to a maximum of the given numbers of the classifiers; and determining the performance status of the selected component relative to the threshold number of future flights based on the aggregate indicator.

A1.1. The method of paragraph A1, wherein the method is a method of determining impending component non-performance in the aircraft.

A1.2. The method of any of paragraphs A1-A1.1, wherein the method is a method of determining impending subsystem non-performance in the aircraft.

A1.3. The method of any of paragraphs A1-A1.2, wherein the category indicated by each classifier is a likelihood of non-performance of the selected component within the given number of future flights of the classifier.

A1.4. The method of any of paragraphs A1-A1.3, wherein the selected component is a selected component of a subsystem of the aircraft.

A1.5. The method of any of paragraphs A1-A1.4, wherein the applying includes applying the ensemble of related classifiers to the feature data to produce a classifier indicator for each classifier of the ensemble of related classifiers.

A1.6. The method of any of paragraphs A1-A1.5, wherein the aggregate category indicated by the aggregate indicator is a likelihood of non-performance of the selected component within the threshold number of future flights.

A1.7. The method of any of paragraphs A1-A1.6, wherein the aggregate indicator indicates whether the selected component is likely to perform unexpectedly within the threshold number of future flights.

A1.8. The method of any of paragraphs A1-A1.7, wherein the performance status relates to whether the selected component is likely to perform unexpectedly within the threshold number of future flights.

A1.9. The method of any of paragraphs A1-A1.8, wherein the determining includes determining whether the selected component is likely to perform unexpectedly within the threshold number of future flights based on the aggregate indicator.

A2. The method of any of paragraphs A1-A1.9, wherein the flight data was collected during a series of flights.

A3. The method of any of paragraphs A1-A2, further comprising collecting the flight data during a flight or series of flights of the aircraft.

A3.1. The method of paragraph A3, wherein the collecting includes collecting the flight data with a sensor on board the aircraft.

A4. The method of any of paragraphs A1-A3.1, wherein the flight data was collected with a sensor on board the aircraft.

A5. The method of any of paragraphs A1-A4, wherein the subsystem is at least one of a bleed air system, an environmental control system, a propulsion system, a flight control system, an electrical system, and a hydraulic system.

A6. The method of any of paragraphs A1-A5, wherein the selected component is at least one of an actuator, a valve, an air regulator, a primary bleed air pressure regulator, a shutoff valve, a condenser, an air cycle machine, an engine, an electronics module, a switch, an indicator, a pump, and a battery.

A7. The method of any of paragraphs A1-A6, wherein the extracting includes determining a statistic of flight data during a time window, and optionally wherein the flight data includes sensor values.

A7.1. The method of paragraph A7, wherein the statistic includes, optionally is, at least one of a minimum, a maximum, an average, a variance, a deviation, a cumulative value, a rate of change, and an average rate of change.

A7.2. The method of any of paragraphs A7-A7.1, wherein the statistic includes, optionally is, a total number of data points, a maximum number of sequential data points, a minimum number of sequential data points, an average number of sequential data points, an aggregate time, a maximum time, a minimum time, and/or an average time that the sensor values are above, below, or about equal to a threshold value.

A7.3. The method of any of paragraphs A7-A7.2, wherein the time window includes, optionally is, a duration of the flight, a portion of a duration of the flight, and/or a period of time including one or more flights of the aircraft, and optionally, when also depending from paragraph A2, wherein the time window includes a duration of each of the series of flights.

A7.4. The method of any of paragraphs A7-A7.3, wherein the sensor values include at least one of an airspeed, an engine throttle setting, a pressure, a temperature, a voltage, a current, an ambient temperature, an ambient pressure, a compressor discharge pressure, a compressor discharge temperature, a bleed air pressure, and a bleed air temperature.

A8. The method of any of paragraphs A1-A7.4, wherein the extracting includes determining a difference of sensor values during a time window and wherein the flight data includes the sensor values.

A8.1. The method of paragraph A8, wherein the time window includes, optionally is, a duration of the flight, a portion of a duration of the flight, and/or a period of time including one or more flights of the aircraft, and optionally, when also depending from paragraph A2, wherein the time window includes a duration of each of the series of flights.

A9. The method of any of paragraphs A1-A8.1, wherein the extracting includes determining a difference between a first sensor value and a second sensor value, and wherein the flight data includes the first sensor value and the second sensor value.

A9.1. The method of paragraph A9, wherein the first sensor value and the second sensor value relate to the same sensed parameter, and optionally wherein the sensed parameter is selected from the group of a pressure, a temperature, a speed, a voltage, and a current.

A9.2. The method of any of paragraphs A9-A9.1, wherein the first sensor value and the second sensor value are measured at different locations.

A9.3. The method of any of paragraphs A9-A9.2, wherein the first sensor value and the second sensor value are measured at different points in time.

A10. The method of any of paragraphs A1-A9.3, wherein the feature data includes at least one of a minimum of a sensor value, a maximum of a sensor value, an average of a sensor value, a variance of a sensor value, a deviation of a sensor value, a cumulative value of a sensor value, and a difference of sensor values.

A11. The method of any of paragraphs A1-A10, wherein each classifier is configured to classify the feature data as indicating either an impending non-performance event of the selected component or no impending non-performance event of the selected component.

A12. The method of any of paragraphs A1-A11, wherein each classifier indicator indicates either an impending non-performance event of the selected component or no impending non-performance event of the selected component.

A13. The method of any of paragraphs A1-A12, wherein each classifier is configured to estimate a likelihood of non-performance of the selected component within the classifier's given number of future flights.

A14. The method of any of paragraphs A1-A13, wherein each classifier indicator is an estimate of a likelihood of non-performance of the selected component within the corresponding classifier's given number of future flights.

A15. The method of any of paragraphs A1-A14, wherein the given numbers of the classifiers form a sequence of consecutive integers beginning with 1.

A16. The method of any of paragraphs A1-A15, wherein the ensemble of related classifiers includes a first classifier with a given number of 1 and a second classifier with a given number of 2.

A17. The method of any of paragraphs A1-A16, wherein each classifier is the result of guided machine learning.

A18. The method of any of paragraphs A1-A17, wherein at least one, optionally each, classifier is formed by at least one of a naïve Bayes classifier, a support vector machine, a learned decision tree, an ensemble of learned decision trees, and a neural network.

A19. The method of any of paragraphs A1-A18, wherein at least one, optionally each, classifier includes at least one of a statistical correlation and a regression.

A20. The method of any of paragraphs A1-A19, wherein the aggregating includes setting the aggregate indicator to one of a maximum value of the classifier indicators, a minimum value of the classifier indicators, a median value of the classifier indicators, an average value of the classifier indicators, a mode of the classifier indicators, a most common value of the classifier indicators, and a cumulative value of the classifier indicators.

A21. The method of any of paragraphs A1-A20, wherein the aggregating includes classifying each classifier indicator as one of two states, wherein the states include an impending-non-performance state and a likely-performance state, and wherein the aggregating includes setting the aggregate indicator to a most common state of the classifier indicators.

A22. The method of any of paragraphs A1-A21, further comprising displaying the aggregate indicator by visual, audio, and/or tactile display.

A23. The method of any of paragraphs A1-A22, further comprising signaling by visual, audio, and/or tactile indicator that the selected component is likely to have a non-performance event within the threshold number of future flights.

A24. A computerized system comprising:
a computer-readable memory;
a processing unit operatively coupled to the computer-readable memory; and
a computer-readable storage media assemblage, wherein the storage media assemblage is operatively coupled to the computer-readable memory and includes instructions, that when executed by the processing unit, cause the system to perform the method of any of paragraphs A1-A23.

A25. A method of preventive maintenance for an aircraft, the method comprising:
performing the method of any of paragraphs A1-A23; and
determining whether to repair the selected component before the threshold number of future flights.

A26. The method of paragraph A25, further comprising, upon determining that the aggregate indicator is less than, greater than, and/or about equal to a limit, repairing the selected component before the threshold number of future flights.

B1. A system for determining a performance category of a selected component in an aircraft, the system comprising:
a feature extraction module configured to extract feature data from flight data collected during a flight of the aircraft, wherein the feature data relates to performance of one or more components of the aircraft and/or a subsystem of the aircraft;
a classification module configured to produce a classifier indicator for each classifier of an ensemble of related classifiers, wherein each classifier is configured to indicate a category of the selected component of the aircraft within a given number of future flights based upon the feature data, and wherein the given number for each classifier is different; and
an aggregation module configured to produce an aggregate indicator that indicates a performance category of the selected component for a threshold number of future flights, wherein the threshold number is greater than or equal to a maximum of the given numbers of the classifiers.

B1.1. The system of paragraph B1, wherein the system is a system for determining impending component non-performance in the aircraft.

B1.2. The system of any of paragraphs B1-B1.1, wherein the system is a system for determining impending subsystem non-performance in the aircraft.

B1.3. The system of any of paragraphs B1-B1.2, wherein the category indicated by each classifier is a likelihood of non-performance of the selected component within the given number of future flights of the classifier.

B1.4. The system of any of paragraphs B1-B1.3, wherein the selected component is a selected component of a subsystem of the aircraft.

B1.5. The system of any of paragraphs B1-B1.4, wherein the performance category indicated by the aggregate indicator is a likelihood of non-performance of the selected component within the threshold number of future flights.

B1.6. The system of any of paragraphs B1-B1.5, wherein the aggregate indicator indicates whether the selected component is likely to perform unexpectedly within the threshold number of future flights.

B2. The system of any of paragraphs B1-B1.6, further comprising a data link configured to communicate with a flight data storage system, and optionally wherein the flight data storage system is on board the aircraft.

B3. The system of any of paragraphs B1-B2, further comprising a display, wherein the display is configured to indicate the aggregate indicator with a visual, audio, and/or tactile display.

B4. The system of any of paragraphs B1-B3, further comprising a sensor on board the aircraft, wherein the sensor is configured to collect flight data during the flight of the aircraft.

B5. The system of any of paragraphs B1-B4, wherein the subsystem is at least one of a bleed air system, an environmental control system, a propulsion system, a flight control system, an electrical system, and a hydraulic system.

B6. The system of any of paragraphs B1-B5, wherein the selected component is at least one of an actuator, a valve, an air regulator, a primary bleed air pressure regulator, a shutoff valve, a condenser, an air cycle machine, an engine, an electronics module, a switch, an indicator, a pump, and a battery.

B7. The system of any of paragraphs B1-B6, wherein the feature extraction module is configured to determine a statistic of flight data during a time window, and optionally wherein the flight data includes sensor values.

B7.1. The system of paragraph B7, wherein the statistic includes, optionally is, at least one of a minimum, a maximum, an average, a variance, a deviation, a cumulative value, a rate of change, and an average rate of change.

B7.2. The system of any of paragraphs B7-B7.1, wherein the statistic includes, optionally is, at least one of a total number of data points, a maximum number of sequential data points, a minimum number of sequential data points, an average number of sequential data points, an aggregate time, a maximum time, a minimum time, and an average time that the sensor values are above, below, or about equal to a threshold value.

B7.3. The system of any of paragraphs B7-B7.2, wherein the time window includes, optionally is, a duration of the flight, a portion of a duration of the flight, and/or a period of time including one or more flights of the aircraft.

B7.4. The system of any of paragraphs B7-B7.3, wherein the sensor values include at least one of an airspeed, an engine throttle setting, a pressure, a temperature, a voltage, a current, an ambient temperature, an ambient pressure, a compressor discharge pressure, a compressor discharge temperature, a bleed air pressure, and a bleed air temperature.

B8. The system of any of paragraphs B1-B7.4, wherein the feature extraction module is configured to determine a difference of sensor values during a time window and wherein the flight data includes the sensor values.

B8.1. The system of paragraph B8, wherein the time window includes, optionally is, a duration of the flight, a portion of a duration of the flight, and/or a period of time including one or more flights of the aircraft.

B9. The system of any of paragraphs B1-B8.1, wherein the feature extraction module is configured to determine a difference between a first sensor value and a second sensor value, and wherein the flight data includes the first sensor value and the second sensor value.

B9.1. The system of paragraph B9, wherein the first sensor value and the second sensor value relate to the same sensed parameter, and optionally wherein the sensed parameter is selected from the group of a pressure, a temperature, a speed, a voltage, and a current.

B9.2. The system of any of paragraphs B9-B9.1, wherein the first sensor value and the second sensor value are measured at different locations.

B9.3. The system of any of paragraphs B9-B9.2, wherein the first sensor value and the second sensor value are measured at different points in time.

B10. The system of any of paragraphs B1-B9.3, wherein each classifier is configured to classify the feature data as indicating either an impending non-performance event of the selected component or no impending non-performance event of the selected component.

B11. The system of any of paragraphs B1-B10, wherein each classifier indicator indicates either an impending non-performance event of the selected component or no impending non-performance event of the selected component.

B12. The system of any of paragraphs B1-B11, wherein each classifier is configured to estimate a likelihood of non-performance of the selected component within the classifier's given number of future flights.

B13. The system of any of paragraphs B1-B12, wherein each classifier indicator is an estimate of a likelihood of non-performance of the selected component within the corresponding classifier's given number of future flights.

B14. The system of any of paragraphs B1-B13, wherein the given numbers of the classifiers form a sequence of consecutive integers beginning with 1.

B15. The system of any of paragraphs B1-B14, wherein the ensemble of related classifiers includes a first classifier with a given number of 1 and a second classifier with a given number of 2.

B16. The system of any of paragraphs B1-B15, wherein each classifier is the result of guided machine learning.

B17. The system of any of paragraphs B1-B16, wherein at least one, optionally each, classifier is formed by at least one of a naïve Bayes classifier, a support vector machine, a learned decision tree, an ensemble of learned decision trees, and a neural network.

B18. The system of any of paragraphs B1-B17, wherein at least one, optionally each, classifier includes at least one of a statistical correlation and a regression.

B19. The system of any of paragraphs B1-B18, wherein the aggregation module is configured to set the aggregate indicator to one of a maximum value of the classifier indicators, a minimum value of the classifier indicators, a median value of the classifier indicators, an average value of the classifier indicators, a mode of the classifier indicators, a most common value of the classifier indicators, and a cumulative value of the classifier indicators.

B20. The system of any of paragraphs B1-B19, wherein the aggregation module is configured to classify each classifier indicator as one of two states, wherein the states include an impending-non-performance state and a likely-performance state, and wherein the aggregation module is configured to set the aggregate indicator to a most common state of the classifier indicators.

B21. The system of any of paragraphs B1-B20, further comprising:

a computer-readable memory;

a processing unit operatively coupled to the computer-readable memory; and a computer-readable storage media assemblage, wherein the storage media assemblage is operatively coupled to the computer-readable memory and includes the feature extraction module, the classification module, and the aggregation module.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the singular forms "a", "an" and "the" may be intended to include the plural forms as well, unless the context clearly indicates otherwise.

The various disclosed elements of systems and steps of methods disclosed herein are not required of all systems, apparatuses, and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses, and methods that are expressly disclosed herein, and such inventive subject matter may find utility in systems, apparatuses, and/or methods that are not expressly disclosed herein.

The invention claimed is:

1. A method (100), executed on a predictive aircraft maintenance computer system (10), of determining a performance status of a selected component (24) in an aircraft (20), the method comprising:
    extracting (104), by the predictive aircraft maintenance computer system, feature data from flight data collected during a flight of the aircraft, wherein the feature data relates to performance of one or more components (24) of the aircraft;
    applying (106), by the predictive aircraft maintenance computer system, an ensemble of related classifiers (66) configured to identify categories to which the feature data belong to produce a classifier indicator for each classifier of the ensemble of related classifiers, wherein each classifier is configured to indicate a category of the selected component of the aircraft within a given number of future flights, and wherein the given number for each classifier is different;
    aggregating (108), by the predictive aircraft maintenance computer system, the classifier indicators to produce an aggregate indicator that indicates an aggregate category of the selected component for a threshold number of future flights, wherein the threshold number is greater than or equal to a maximum of the given numbers of the classifiers;
    determining (110), by the predictive aircraft maintenance computer system, the performance status of the selected component relative to the threshold number of future flights based on the aggregate indicator; and
    based on the performance status indicating a predicted impending non-performance event of the selected component, causing a maintenance schedule for the aircraft to be modified, wherein modifying the maintenance schedule comprises generating a schedule event to have the selected component repaired prior to the predicted impending non-performance event.

2. The method of claim 1, wherein the component is at least one of an actuator, a valve (28), an air regulator, a primary bleed air pressure regulator, and a shutoff valve.

3. The method of claim 1, wherein the extracting includes determining a statistic of flight data during a time window.

4. The method of claim 1, wherein the extracting includes determining a difference of sensor values during a time window and wherein the flight data includes the sensor values.

5. The method of claim 1, wherein the extracting includes determining a difference between a first sensor value and a second sensor value, and wherein the flight data includes the first sensor value and the second sensor value.

6. The method of claim 1, wherein each classifier indicator indicates either the impending non-performance event of the selected component or no impending non-performance event of the selected component.

7. The method of claim 1, wherein the given numbers of the classifiers form a sequence of consecutive integers beginning with 1.

8. The method of claim 1, wherein the aggregating includes setting the aggregate indicator to one of a maximum value of the classifier indicators, a most common value of the classifier indicators, and a cumulative value of the classifier indicators.

9. The method of claim 1, wherein the aggregating includes classifying each classifier indicator as one of two states, wherein the states include an impending-non-performance state and a likely-performance state, and wherein the aggregating includes setting the aggregate indicator to a most common state of the classifier indicators.

10. A method (100), executed on a predictive aircraft maintenance computer system, of preventive maintenance for an aircraft (20), the method including:
    performing the method of claim 1 with the predictive aircraft maintenance computer system; and
    determining, with the predictive aircraft maintenance computer system, whether to repair the selected component before the threshold number of future flights.

11. A predictive aircraft maintenance computer system (10) comprising:
    at least one processing unit (202);
    a computer-readable memory (206) storing non-transitory computer-readable instructions (220) that, when executed by the at least one processing unit, cause the predictive aircraft maintenance computer system to:
        extract feature data from flight data collected during a flight of an aircraft (20), wherein the feature data relates to performance of one or more components of the aircraft;
        produce a classifier indicator for each classifier of an ensemble of related classifiers (66), wherein each classifier is configured to indicate a category of a selected component (24) of the aircraft within a given number of future flights based upon the feature data, and wherein the given number for each classifier is different;
        produce an aggregate indicator that indicates a performance category of the selected component for a threshold number of future flights, wherein the threshold number is greater than or equal to a maximum of the given numbers of the classifiers; and
        modify, based on the aggregate indicator indicating a predicted impending non-performance event of the selected component, a maintenance schedule for the aircraft to have the selected component repaired prior to the predicted impending non-performance event.

12. The predictive aircraft maintenance computer system of claim 11, further comprising a data link (74) configured to communicate with a flight data storage system (50), and wherein the flight data storage system is on board the aircraft.

13. The predictive aircraft maintenance computer system of claim 11, further comprising a display, wherein the display is configured to indicate the aggregate indicator with at least one of a visual display, an audio display, and a tactile display.

14. The predictive aircraft maintenance computer system of claim 11, wherein the selected component is at least one of an actuator, a valve, an air regulator, a primary bleed air pressure regulator, and a shutoff valve.

15. The predictive aircraft maintenance computer system of claim 11, wherein the instructions, when executed by the at least one processing unit, further cause the predictive aircraft maintenance computer system to determine a statistic of flight data during a time window.

16. The predictive aircraft maintenance computer of claim 11, wherein the given numbers of the classifiers form a sequence of consecutive integers beginning with 1.

17. The predictive aircraft maintenance computer system of claim 11, wherein the ensemble of related classifiers includes a first classifier (66) with a given number of 1 and a second classifier (66) with a given number of 2.

18. The predictive aircraft maintenance computer system of claim 11, wherein each classifier is the result of guided machine learning.

19. The predictive aircraft maintenance computer system of claim 11, wherein the instructions, when executed by the at least one processing unit, further cause the predictive aircraft maintenance computer system to set the aggregate indicator to one of a maximum value of the classifier indicators, a most common value of the classifier indicators, and a cumulative value of the classifier indicators.

20. The predictive aircraft maintenance computer system of claim 11, wherein the instructions, when executed by the at least one processing unit, further cause the predictive aircraft maintenance computer system to:
   classify each classifier indicator as one of two states, wherein the states include an impending-non-performance state and a likely-performance state; and
   set the aggregate indicator to a most common state of the classifier indicators.

* * * * *